July 4, 1950  P. EISENBERG  2,513,295
TENSION DYNAMOMETER
Filed July 31, 1947
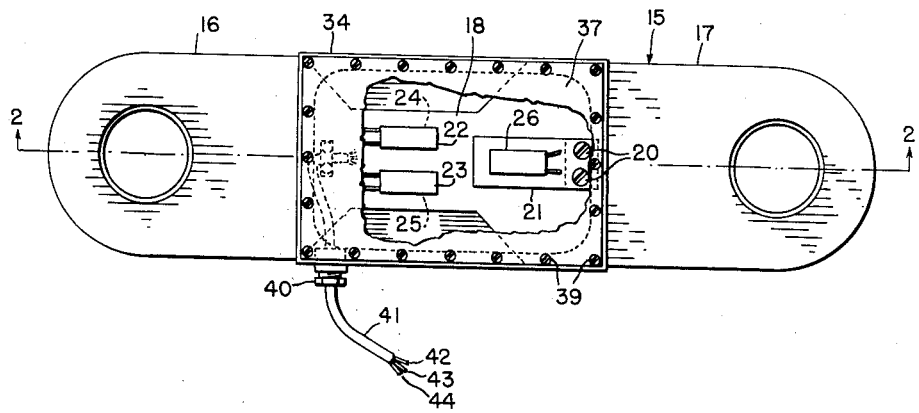
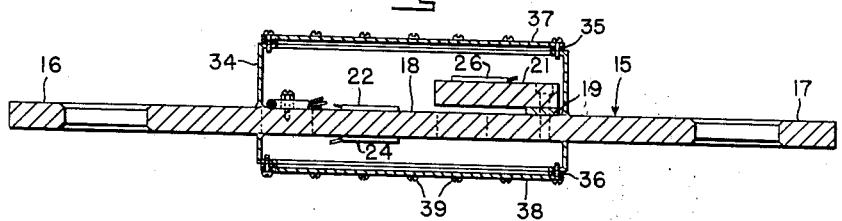
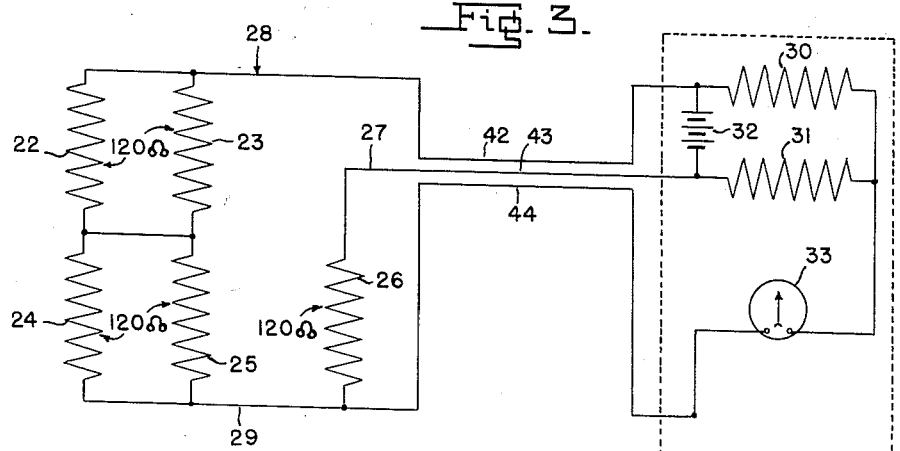
INVENTOR.
Phillip Eisenberg
BY
D.C. Snyder
ATTORNEY.

Patented July 4, 1950

2,513,295

UNITED STATES PATENT OFFICE 2,513,295

TENSION DYNAMOMETER

Phillip Eisenberg, Detroit, Mich.

Application July 31, 1947, Serial No. 765,223

1 Claim. (Cl. 73—141)

(Granted under the act of March 3, 1883, as amended April 30, 1928; 370 O. G. 757)

The invention relates to improvements in measuring and testing equipment and more specifically to a tension dynamometer using electric wire resistance strain gages as sensitive elements.

The primary object of the invention is to provide a dynamometer for measuring tensile forces in a cable or towline.

Another object is to provide a dynamometer which is insensitive to changes in temperature and which is not affected by immersion in water.

A further object is the provision of a dynamometer which is reliable, accurate, and easy to construct and operate.

A still further object is the provision of a dynamometer that may readily be arranged to give an indication remote from the force being measured.

Other objects and advantages of the invention will become apparent during the course of the following detailed description, taken in connection with the accompanying drawing, forming a part of this specification, and in which drawing:

Figure 1 is a top plan view of the dynamometer bar, its watertight shield being shown partially broken away to disclose the strain gage arrangement.

Figure 2 is a central vertical longitudinal sectional view of the dynamometer substantially on the line 2—2 of Figure 1.

Figure 3 is a diagrammatic view of a Wheatstone bridge measuring circuit that may be used with the dynamometer.

In the drawing, which for the purpose of illustration shows only a preferred embodiment of the invention, and wherein similar reference characters denote corresponding parts throughout the views, the numeral 15 designates a machined flat steel bar with apertured end portions 16, 17 for attachment to standard fittings in a cable or towline. Between its end portions 16, 17 the bar is cut away at opposite sides to form a reduced intermediate portion 18. Secured in spaced parallel relation to the bar adjacent its reduced intermediate portion 18, as by a spacer block 19 and screws 20, is a thermal plate 21 that is isolated from strain produced in the reduced portion 18 by tensile loading of the bar but nevertheless is so near the loaded portion that both are subject to substantially identical temperature changes.

Cemented on the reduced intermediate portion 18 are four electric wire resistance strain gages 22—25 arranged in pairs at opposite sides of the bar and in laterally spaced relation symmetrically of its longitudinal axis. The gages 22—25 may be of the type shown and described in the Simmons Patent 2,292,549.

The sensitivity of the dynamometer is a function of the modulus of elasticity of the material employed and the cross-sectional area of the reduced intermediate portion 18.

Inasmuch as changes in temperature of the strain wire and changes in length of the gage support due to temperature variations alter the resistance of the strain gages, temperature effects must ordinarily be considered in the design of the instrument. A strain gage 26 is cemented on the thermal plate 21 and connected in one arm 27 of the bridge circuit 28 shown in Figure 3. By connecting the four measuring gages 22—25 in series-parallel arrangement in an arm 29 adjacent arm 27, changes in resistance of the measuring gages 22—25 and the temperature-compensating gage 26 due to the temperature effects will be electrically cancelled. The resistance of the four-gage measuring arm 29 will equal that of the one-gage temperature-compensating arm 27 provided the resistance of all five gages is the same. The arms 27, 29 of the dynamometer may be connected into any suitable bridge circuit and the bridge unbalance may be indicated or recorded by any suitable device or by a null method. In the example shown, two additional arms 30, 31, a battery 32, and a galvanometer 33 complete the measuring circuit.

The dynamometer bar 15 is provided with a box-like housing or shield 34 for mechanical protection of the gages and wiring. This shield is made watertight as by providing soft rubber gaskets 35, 36 on which cover plates 37, 38 are removably held in sealing relation as by cap-screws 39. The individual strain gages may be coated with a suitable waterproofing composition for additional protection. Extending into the housing or shield through a suitable stuffing box 40 is an electric cable 41 including three wires 42—44 for connection to the gages as shown in Figure 3.

The dynamometer may be calibrated by using a suitable structural strength testing machine to apply known axial loads to the bar while the strains are read on the galvanometer 33. The relationship of applied load to the measured strains is linear with deviations of less than one per cent at all load values. The sensitivity factor used to determine applied load from the measurement of strain output is expressed in micro-inches per inch per 1,000 pounds load.

In the use of the dynamometer for measurement of static loads, the dynamometer is connected to a suitable measuring circuit having an indicator such as the galvanometer 33. With transient or pulsating loads where the relationship between load and time is required, the dynamometer may be used with a suitable dynamic bridge, amplifier, and recording system (not shown). Torsion and bending effects in the bar at the reduced portion 18 produce in the upper gage pairs 22, 23 strains that are equal and opposite to the strains produced in the lower gage pairs 24, 25; thus the instrument is sensitive only to changes in axial loading.

Various modifications may be made in the form of invention herein shown and described without departing from the spirit of the invention or the scope of the following claim.

The invention described herein may be manufactured and used by or for the Government of the United States of America for governmental purposes without the payment of any royalties thereon or therefor.

I claim:

A dynamometer comprising a flat bar including an intermediate section adapted to be strained by a load to be measured, at least one stub projecting from a side of the bar adjacent the intermediate section whereby the stub and intermediate section are subject to substantially identical temperature changes but the stub is not strained by the load to be measured, and an electrical bridge circuit for measuring the load carried by said bar including four electric resistance strain gages of similar effective initial resistance mounted in pairs on opposite sides of the intermediate section and in pairs symmetrically disposed about the center lines thereof and connected in series-parallel in a first arm of the bridge circuit with said opposite gages in series and said symmetrically disposed gages in parallel so as to be sensitive to changes in strain due to axial loads but not to torsion and bending effects, and so as to be sensitive to changes in temperature in the intermediate section, and electric resistance strain gage means mounted on said stub and connected in an arm of the bridge circuit adjacent said first arm so as to compensate for temperature changes affecting the first-mentioned strain gages.

PHILLIP EISENBERG.

REFERENCES CITED

The following references are of record in the file of this patent:

UNITED STATES PATENTS

| Number | Name | Date |
|---|---|---|
| 2,344,642 | Ruge | Mar. 21, 1944 |
| 2,405,199 | Faust et al. | Aug. 6, 1946 |
| 2,414,161 | Moore | Jan. 14, 1947 |
| 2,439,146 | Ruge | Apr. 6, 1948 |